United States Patent
Cho et al.

(10) Patent No.: US 8,055,305 B2
(45) Date of Patent: Nov. 8, 2011

(54) METHOD AND APPARATUS FOR INPUTTING FUNCTION OF MOBILE TERMINAL USING USER'S GRIP POSTURE WHILE HOLDING MOBILE TERMINAL

(75) Inventors: Sung-jung Cho, Suwon-si (KR);
Hyun-jeong Lee, Yongin-si (KR);
Joon-ah Park, Seoul (KR); Wook Chang, Seoul (KR); Kee-eung Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 755 days.

(21) Appl. No.: 11/476,631

(22) Filed: Jun. 29, 2006

(65) Prior Publication Data
US 2007/0002016 A1    Jan. 4, 2007

(30) Foreign Application Priority Data
Jun. 29, 2005  (KR) .......................... 10-2005-0056933

(51) Int. Cl.
*H04B 1/38* (2006.01)
*H04M 1/00* (2006.01)
*G09G 5/00* (2006.01)

(52) U.S. Cl. .................. 455/566; 455/550.1; 455/575.1; 345/649

(58) Field of Classification Search ............... 455/550.1, 455/556.1, 556.2, 566, 575.1
See application file for complete search history.

(56) References Cited

U.S. PATENT DOCUMENTS

| 6,298,230 | B1 * | 10/2001 | Schneider-Hufschmidt . 455/411 |
| 7,098,894 | B2 * | 8/2006 | Yang et al. ..................... 345/166 |
| RE40,116 | E * | 2/2008 | Engstrom .................... 455/66.1 |
| 7,440,003 | B2 * | 10/2008 | Shimamura et al. ....... 348/14.02 |
| 2001/0014616 | A1 * | 8/2001 | Matsuda et al. .............. 455/567 |
| 2001/0044318 | A1 * | 11/2001 | Mantyjarvi et al. .......... 455/550 |
| 2002/0115469 | A1 * | 8/2002 | Rekimoto et al. ............ 455/550 |
| 2002/0198006 | A1 * | 12/2002 | Hirayama et al. ............ 455/456 |
| 2004/0157647 | A1 * | 8/2004 | Takahashi ..................... 455/566 |
| 2004/0204016 | A1 * | 10/2004 | Sakamoto ................. 455/550.1 |
| 2005/0035955 | A1 * | 2/2005 | Carter et al. .................. 345/175 |
| 2005/0143124 | A1 * | 6/2005 | Kennedy et al. ........... 455/556.1 |

(Continued)

FOREIGN PATENT DOCUMENTS
KR    10-2006-0028295    3/2006

*Primary Examiner* — Michael Thier
(74) *Attorney, Agent, or Firm* — Staas & Halsey LLP

(57) ABSTRACT

An apparatus for and a method of inputting a function of a mobile terminal such as a mobile phone, in which a grip posture of a user who holds the mobile terminal is recognized and a function corresponding to the recognized grip posture is detected. The method includes: recognizing a grip posture of a user who uses the mobile terminal; detecting a function corresponding to the recognized grip posture; and performing the detected function. Accordingly, by considering user's grip postures formed when performing the functions of a mobile terminal such as a mobile phone, specific functions are respectively matched to a plurality of grip postures, a grip posture of a user who is holding the mobile terminal is recognized, and a function corresponding to the recognized grip posture is automatically performed without any operation such as an additional key input operation. Therefore, a complex input unit or input method is not required even when diverse functions are provided by the mobile terminal, and the user can easily and conveniently use the mobile terminal.

31 Claims, 6 Drawing Sheets

U.S. PATENT DOCUMENTS

| | | | |
|---|---|---|---|
| 2005/0250553 A1* | 11/2005 | Lim | 455/569.1 |
| 2006/0084482 A1* | 4/2006 | Saila | 455/575.1 |
| 2006/0238513 A1* | 10/2006 | Philipp | 345/173 |
| 2006/0248478 A1* | 11/2006 | Liau | 715/863 |
| 2008/0214250 A1* | 9/2008 | Chauhan et al. | 455/575.1 |

* cited by examiner

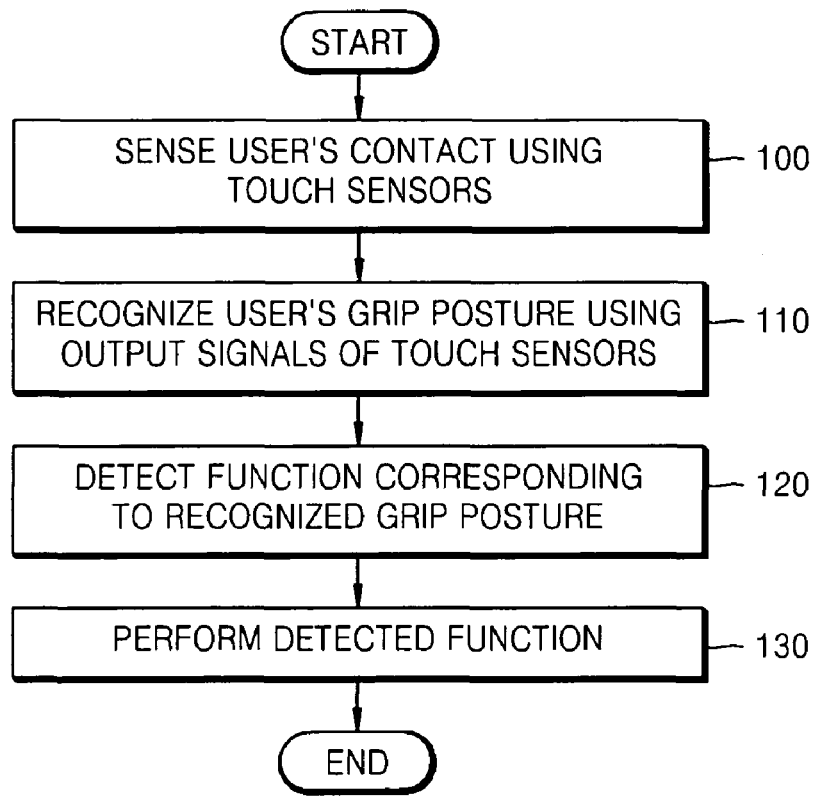
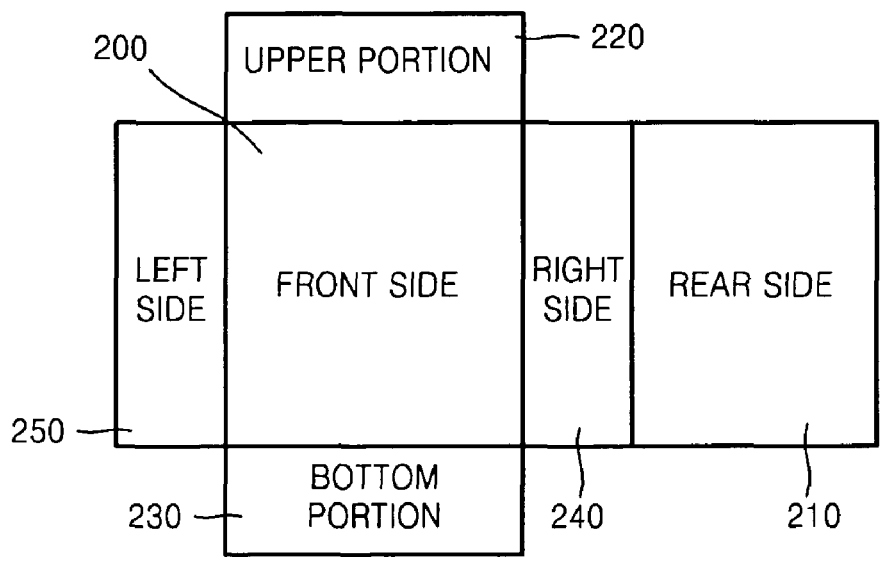

LEFT HAND　　　　　　　　RIGHT HAND

METHOD AND APPARATUS FOR INPUTTING FUNCTION OF MOBILE TERMINAL USING USER'S GRIP POSTURE WHILE HOLDING MOBILE TERMINAL

CROSS-REFERENCE TO RELATED APPLICATION

This application claims the priority of Korean Patent Application No. 10-2005-0056933, filed on Jun. 29, 2005, in the Korean Intellectual Property Office, the disclosure of which is incorporated herein by reference.

BACKGROUND OF THE INVENTION

1. Field of the Invention

The present invention relates to a method and apparatus for receiving a desired function from a user in a mobile terminal such as a mobile phone, and more particularly, to a method and apparatus for inputting a function of a mobile terminal, in which a grip posture of a user who holds the mobile terminal is recognized and a function corresponding to the recognized grip posture is executed.

2. Description of Related Art

Typically, when using a mobile terminal, a user selects a function such as making a phone call, or sending or receiving a text message, and inputs Korean characters, English characters and numbers using a plurality of buttons included in the mobile terminal.

Recent mobile terminals such as mobile phones have developed to combine the typical main functions of the mobile terminals, which include a phone call and a text message function, with another electronic machine functions. For instance, mobile phones now have various functions such as an MP3 file playing function of an MP3 player, an image recording and viewing function of a digital camera, a digital dictionary function, and a digital TV function.

An increase in functions of mobile terminals usually results in an increase in price, size and complexity, which is not desirable to users. Therefore, it is important to keep the device size as small as possible while maximizing the number of device functions.

Even when it is not difficult to add various functions to mobile terminals or miniaturize the devices for the mobile terminals with the development of technology, technical problems to be solved for providing a user interface that allows users to promptly and easily input complicated functions and control the terminal are increased. For example, a user interface that reduces key input steps necessary for performing a specific function, or easily managing, searching and playing a number of digital contents such as pictures, browsing images, music contents, e-mails, and the like is required.

For instance, to download the latest music ringtones by accessing the Internet wireless using a mobile phone, a user presses a wireless Internet access button, selects, for example, a My Phone Bell menu after accessing the wireless Internet, then selects a Ringtones menu which is a sub menu of the My Phone Bell menu, and finally selects the Latest Ringtones menu which is a sub menu of the Ringtones menu. In this case, the user needs to press buttons a total of four times.

In the case of a mobile terminal, an increase in the number of buttons for inputting a plurality of functions as described above may be impossible due to the limited size of the terminal, and can make a user input operation complicated. Moreover, when the number of buttons for key input is not increased, the number of key pressing times for selecting a specific function is increased.

BRIEF SUMMARY

An aspect of the present invention provides a method and apparatus for inputting a function of the mobile terminal in which general grip postures of a user holding the mobile terminal are recognized and a function corresponding to each grip posture is automatically performed without any additional operation such as a key input operation.

According to an aspect of the present invention, there is provided a method of inputting a function of a mobile terminal, the method including: recognizing a grip posture of a user gripping the mobile terminal; detecting a function corresponding to the recognized grip posture; and performing the detected function.

The recognizing of the grip posture may include: receiving output signals from a plurality of touch sensors formed on the mobile terminal; and recognizing the grip posture of the user using the output signals from the touch sensors.

The plurality of touch sensors may be arranged on a surface of the mobile terminal at regular intervals, or the surface of the mobile terminal may be divided into a plurality of portions, and then the plurality of touch sensors may be arranged in each portion of the mobile terminal at different intervals according to how frequently the user touches each portion of the mobile terminal when the user holds the mobile terminal.

The plurality of portions of the mobile terminal may include a front side, a rear side, an upper portion, a bottom portion, a left side and a right side of the mobile terminal. The recognizing of the grip posture using the sensor output signals may comprise: dividing the surface of the mobile terminal into a plurality of portions; detecting at least one of the number of contact points, the contact width, and a distance between adjacent contact points in each portion of the mobile terminal using the sensor output signals; and determining the user's grip posture using at least one of the detected number of contact points, the contact width, and a distance between adjacent contact points in each portion of the mobile terminal.

In the recognizing of the grip posture using the sensor output signals, the user's grip posture may be recognized from the sensor output signals by using one of an artificial neuron network, a template matching, a hidden Markov model, and an SVM (support vector machine).

The recognizing of the grip posture may include: dividing the surface of the mobile terminal into a plurality of portions; detecting at least one of the number of contact points, a contact width, and a distance between adjacent contact points in each portion of the mobile terminal; and determining the user's grip posture using at least one of the detected number of contact points, a contact width, and a distance between adjacent contact points in each portion of the mobile terminal.

The plurality of portions of the mobile terminal may include a front side, a rear side, an upper portion, a bottom portion, a left side and a right side of the mobile terminal. The grip posture may include at least one of a right hand/horizontal grip, a right hand/vertical grip, a both hands/horizontal grip, a both hands/vertical grip, a left hand/vertical grip, and a left hand/vertical grip.

A function corresponding to the recognized grip posture may be a phone call function when the recognized grip posture is a right hand/vertical grip, a text input function when the recognized grip posture is a both hands/vertical grip, a photography function when the recognized grip posture is a right hand/horizontal grip, or a game function when the recognized grip posture is a both hands/horizontal grip.

The detecting of the function may include detecting one of the functions corresponding to the recognized grip based on at least one of the key input and the current function of the mobile terminal.

If two or more functions correspond to the recognized grip posture, the method may further include: displaying the functions; and receiving a function that the user wants to perform among the displayed two or more functions.

According to another aspect of the present invention, there is provided a function input apparatus included in a mobile terminal, the apparatus including: a grip posture recognition unit recognizing a grip posture of a user gripping the mobile terminal; a function detection unit detecting a function corresponding to the recognized grip posture; and a function performing unit performing the detected function.

The grip posture recognition unit may include a plurality of touch sensors, and recognize the user's grip posture using output signals of the touch sensors.

The plurality of touch sensors may be arranged on the surface of the mobile terminal at regular intervals, or the surface of the mobile terminal may divided into a plurality of portions, and then the plurality of touch sensors may be arranged on each portion of the mobile terminal at different intervals according to how frequently the user touches each portion of the mobile terminal when the user holds the mobile terminal.

The plurality of portions of the mobile terminal may include a front side, a rear side, an upper portion, a bottom portion, a left side and a right side of the mobile terminal.

The grip posture recognition unit may include: a contact detection unit detecting at least one of the number of contact points, a contact width, and a distance between adjacent contact points in each portion; and a grip posture determining unit determining the user's grip posture using at least one of the detected number of contact points, the contact width, and the distance between adjacent contact points at each portion.

The grip posture recognition unit may recognize the user's grip posture from the sensor output signals using one of an artificial neuron network, a template matching, a hidden Markov model, and an SVM.

The grip posture may include at least one of a right hand/horizontal grip, a right hand/vertical grip, a both hands/horizontal grip, a both hands/vertical grip, a left hand/horizontal grip, and a left hand/vertical grip.

A function corresponding to the recognized grip posture may be a phone call function when the recognized grip posture is a right hand/vertical grip, a text input function when the recognized grip posture is a both hands/vertical grip, a photography function when the recognized grip posture is a right hand/horizontal grip, or a game function when the recognized grip posture is a both hands/horizontal grip.

The function detection unit may receive a key input from a user for determine a current function of the mobile terminal when more than one functions are selected by the user's hand grip pattern. Then, the function is determined by combining the key input and the current recognized hand grip pattern.

The function input apparatus may further include: a display unit displaying information to a user; and a user input unit receiving an input from a user, wherein, when two or more functions corresponds to the recognized grip posture, the display unit displays the functions corresponding to the recognized grip posture and the user input unit receives a function that the user wants to perform among the displayed two or more functions from the user.

According to another aspect of the present invention, there is provided a function input apparatus, the apparatus including: a sensor unit having a plurality of touch sensors individually detecting a user's contact with the mobile terminal, the detected contact defining a detected grip posture; a grip posture recognition unit recognizing a grip posture based on the detected grip posture from the sensor unit; and a function detection unit detecting a function corresponding to the recognized grip posture.

The apparatus may further include a function performing unit performing the detected function.

The grip posture recognition unit may include: a characteristic extraction unit extracting characteristic data of a detected grip posture; and a memory search unit searching a memory and outputting as the recognized grip posture a grip posture which is defined in characteristic data stored in the memory that corresponds to the characteristic data of detected grip posture.

Other aspects of the present invention provide computer-readable recording media storing programs for executing the aforementioned methods of the present invention.

Additional and/or other aspects and advantages of the present invention will be set forth in part in the description which follows and, in part, will be obvious from the description, or may be learned by practice of the invention

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 1 is a flowchart illustrating a method of inputting a function into a mobile terminal according to an embodiment of the present invention;

FIGS. 2A and 2B are diagrams for explaining arrangements of touch sensors included in a mobile terminal;

DETAILED DESCRIPTION OF EMBODIMENTS

Figure 2B:
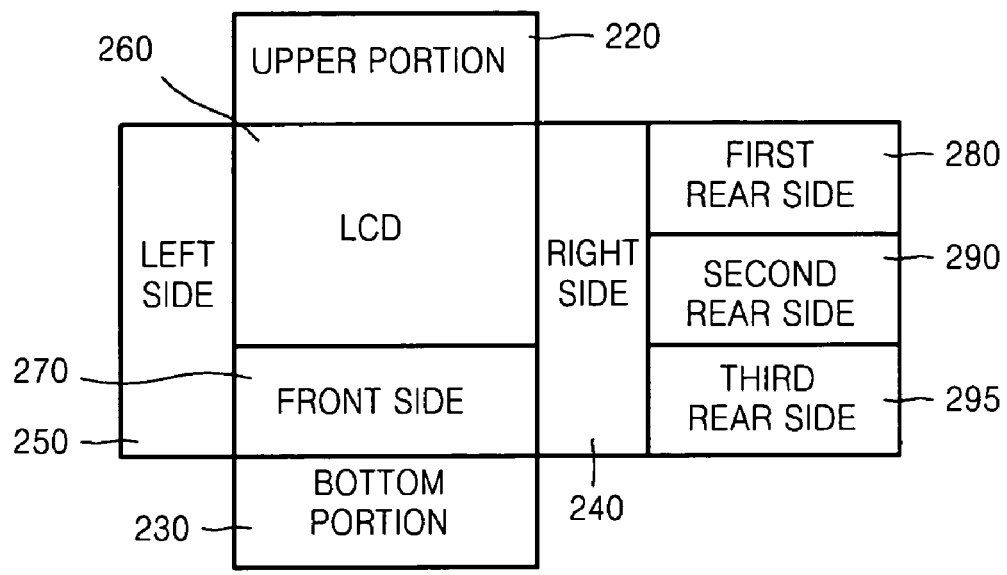

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a flowchart illustrating a method of inputting a function into a mobile terminal according to an embodiment of the present invention. The method illustrated in FIG. 1 will be, for ease of explanation only, described in connection with FIG. 7, which is a block diagram of a function input apparatus included in a mobile terminal according to an embodiment of the present invention.

Figure 7:
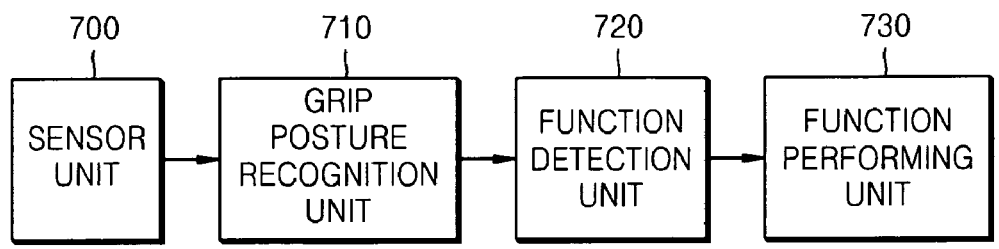
FIG. 7 is a block diagram of a function input apparatus of a mobile terminal according to an embodiment of the present invention.

Referring to FIGS. 1 and 7, when a user holds the mobile terminal for use, a plurality of touch sensors included in a sensor unit 700 individually detect whether the user touches the mobile terminal and output signals corresponding to the detection results (operation 100). The plurality of touch sensors may be arranged on a surface of the mobile terminal at regular intervals. Alternatively, the surface of the mobile terminal can be divided into several portions, and the touch sensors may be arranged in each portion at different intervals according to the user touch frequency in each portion. Since the average width of an adult's finger is 15 mm, a unit used for each touch sensor sensing whether the user touches the mobile terminal can be, by way of a limiting example, less than about 15 mm.

FIG. 2A is a diagram for explaining an approach of dividing the surface of the mobile terminal for the arrangement of the touch sensors. The surface of the mobile terminal is divided into several portions, that is, a front side 200, a rear side 210, an upper portion 220, a bottom portion 230, a left side 250, and a right side 240. The intervals at which the touch sensors are arranged on the plurality of portions divided as described above are set as follows.

The touch frequency on each portion when the user holds the mobile terminal is detected, and the touch sensors are arranged on the frequently touched portions at relatively small intervals and the touch sensors are arranged on the less frequently touched portions at relatively large intervals. For example, the upper portion 220 and the bottom portion 230 are less touched when the user holds the mobile terminal, and thus, the touch sensors are arranged at relatively larger intervals on the upper portion 220 or the bottom portion 230. Meanwhile, since the left and right sides 240 and 250 are frequently touched, the touch sensors may be arranged at relatively smaller intervals in these regions.

The touch frequency on each divided portion may be determined when a user experimentally holds the mobile terminal to perform all functions available in the mobile terminal several times.

FIG. 2B is a diagram for explaining another approach of dividing the surface of the mobile terminal into a plurality of portions for the arrangement of the touch sensors. The surface of the mobile terminal is divided into a liquid crystal display (LCD) 260, a front side 270, a first rear side portion 280, a second rear side portion 290, a third rear side portion 295, an upper portion 220, a bottom portion 270, a left side 250, and a right side 260. As shown in FIG. 2B, when the surface of the mobile terminal is divided into more portions and the intervals between the touch sensors arranged on each portion are adjusted according to the touch frequency, the touch sensors can be more efficiently used.

Figure 8:
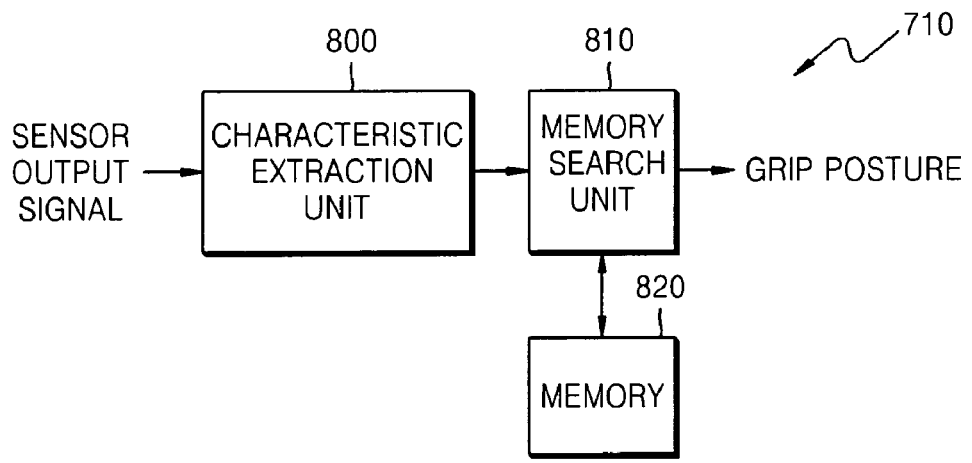
FIG. 8 is a block diagram of a grip posture recognition unit of the function input apparatus shown in FIG. 7.

A grip posture recognition unit 710 receives output signals from the touch sensors of the sensor unit 700, and recognizes a grip posture of a user who holds the mobile terminal (operation 110). FIG. 8 is a block diagram of the grip posture recognition unit 710. The grip posture recognition unit 710 includes a characteristic extraction unit 800, a memory search unit 810, and a memory 820.

The characteristic extraction unit 800 extracts characteristic data of the grip posture of the user who holds the mobile terminal using the sensor output signals received from the sensor unit 700. The memory 820 stores characteristic data defining the grip postures. The memory search unit 810 searches the memory 820, and outputs as the user's grip posture a grip posture which is defined in the characteristic data stored in the memory 820 and identical to the characteristic data of the user's grip posture that is extracted by the characteristic extraction unit 800. A method of defining the characteristic data of each of the grip postures will be described below.

Figure 3:
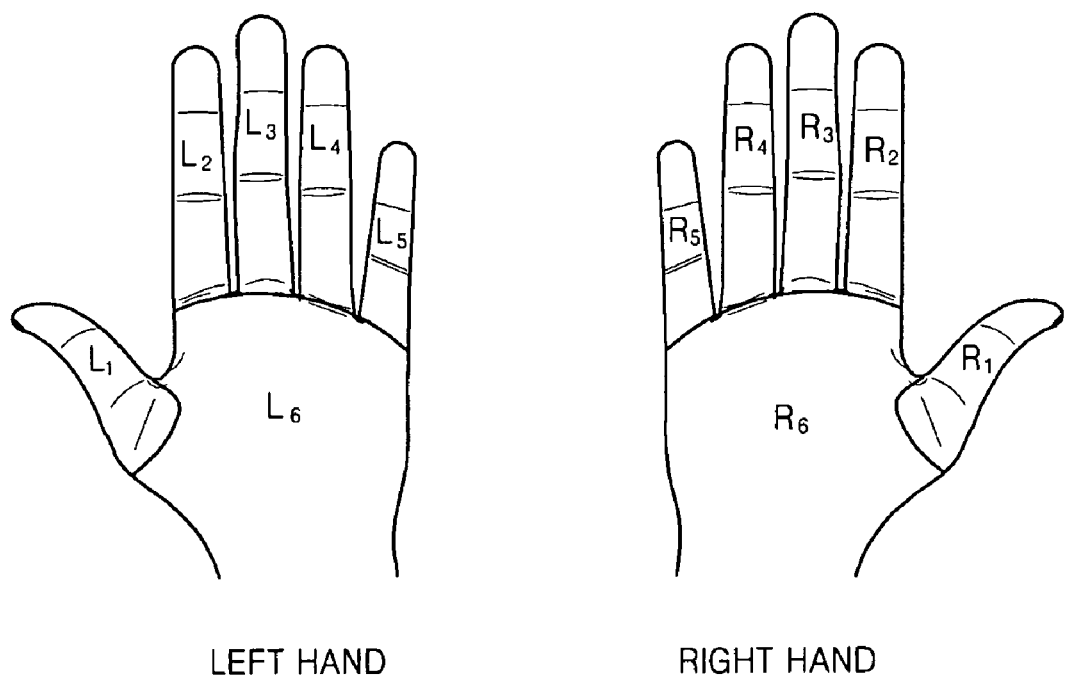
FIG. 3 is a view for explaining a method of dividing user's hands into a plurality of portions for defining a user's grip posture.

FIG. 3 illustrates views for explaining an approach of dividing both hands of a user into a plurality of portions for defining grip postures. Each hand is divided into six portions (L1-L6 for the left hand and R1-R6 for the right hand). A grip posture may be defined according to which portions of each hand shown in FIG. 3 touch which portions of the mobile terminal shown in FIG. 2A or 2B.

Figure 4A:
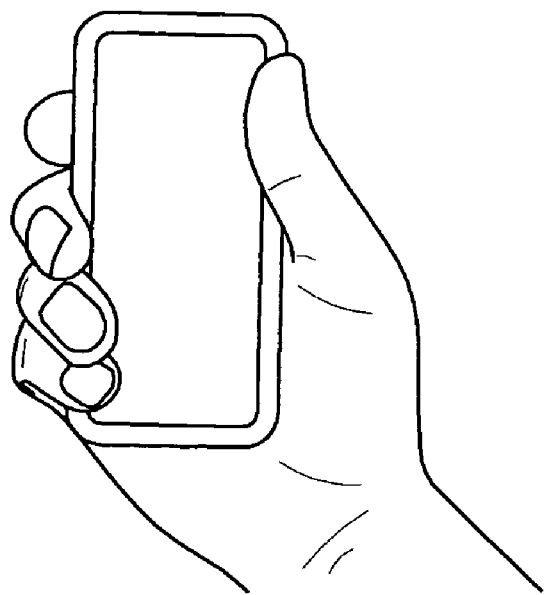
FIGS. 4A, 4B, 4C and 4D are views illustrating user's grip postures when holding the mobile terminal.

FIG. 4A illustrates a right hand of the user who is vertically holding the mobile terminal. Table 1 shows which portions of the right hand touch which portions of the mobile terminal.

TABLE 1

|    | Upper portion | Bottom portion | Left side | Right side | Rear side |
|----|---------------|----------------|-----------|------------|-----------|
| R1 |               |                |           | 1          |           |
| R2 |               |                |           |            |           |
| R3 |               |                | 1         |            |           |
| R4 |               |                | 1         |            |           |
| R5 |               |                | 1         |            |           |
| R6 |               |                |           |            |           |

In Table 1, the portions of the hands and the mobile terminal marked with '1' are the portions which are in contact with each other. Referring to Table 1, a right hand/vertical grip posture is defined as a pattern where the thumb (R1) of the right hand of the user contacts the right side of the mobile terminal and a middle finger R3, a third finger R4, and a pinky finger R5 of the right hand contact the left side.

The grip posture may be further defined by portions of the hand and the mobile terminal which can contact each other depending on circumstances as shown in Table 2. In table 2, the portions of the right hand that can touch the portions of the mobile terminal depending on circumstances are further marked by '*', which can be added to define the right hand/vertical grip posture of Table 1.

TABLE 2

|    | Upper portion | Bottom portion | Left side | Right side | Rear side |
|----|---------------|----------------|-----------|------------|-----------|
| R1 |               |                |           | 1          |           |
| R2 |               |                | *         |            |           |
| R3 |               |                | 1         |            |           |
| R4 |               |                | 1         |            |           |
| R5 |               |                | 1         |            |           |
| R6 |               |                |           | *          |           |

Referring to Table 2, the right hand/vertical grip posture may be further defined as a pattern where a forefinger R2 of the right hand can contact the left side of the mobile terminal and a palm R6 of the right hand can contact the right side, in addition to the contacting portions defined in Table 1.

Figure 5:
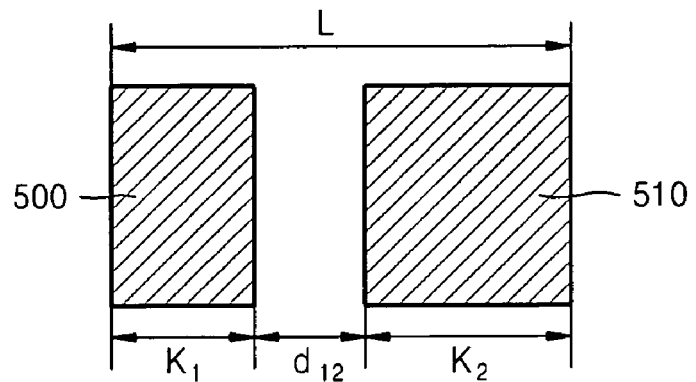
FIG. 5 is a diagram for explaining a method of defining contact points of the mobile terminal according to the user's grip posture.

The grip posture defined by combination of the contacting portions of the hand contacting portions of the mobile terminal may be defined by the number of contact points in each portion of the mobile terminal, the width of each contact point, a distance between adjacent contact points, and the width of the contact points. By doing this, the characteristic data of the defined grip posture can be easily extracted from the output signals of the touch sensors. As shown in FIG. 5, it is assumed that, when there are two contact points 500 and 510, the respective widths of contact points 500 and 510 are $K_1$ and $K_2$, the distance between the adjacent contact points 500 and 510 is $d_{12}$, and the total width of the contact points 500 and 510 is L.

The right hand/vertical grip posture defined in Table 2 may be defined as shown in Table 3.

TABLE 3

|  | Upper portion | Bottom portion | Left side | Right side | Rear side |
|---|---|---|---|---|---|
| Number of contact points |  |  | 3 or 4 | 1 or 2 |  |
| Width of contact point (k) |  |  | 0.5 cm < k | 1 cm < k < 10 cm |  |
| Total Width of contact points (L) |  |  | 2 cm < L < 9.5 cm | 2 cm < L < 11 cm |  |
| Distance between contact points (d) |  |  | d < 3 cm | d < 3 cm |  |

Figure 4B:
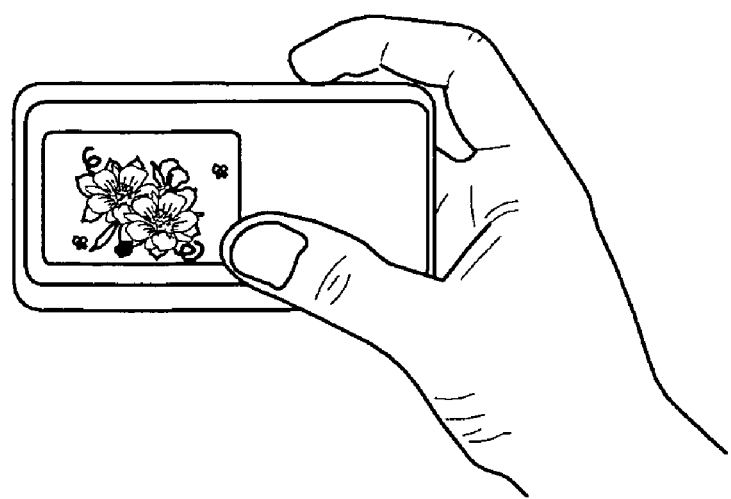

FIG. 4B illustrates the right hand of the user who is holding the mobile terminal horizontally. In Tables 4 and 5, a right hand/horizontal grip posture is defined.

TABLE 4

|  | Upper portion | Bottom portion | Left side | Right side | Rear side |
|---|---|---|---|---|---|
| R1 |  |  |  | * |  |
| R2 |  |  |  | 1 |  |
| R3 |  |  |  |  | 1 |
| R4 |  |  |  |  | * |
| R5 |  |  |  |  |  |
| R6 |  |  | 1 |  |  |

TABLE 5

|  | Upper portion | Bottom portion | Left side | Right side | Rear side |
|---|---|---|---|---|---|
| Number of contact points |  | 1 | 0 or 1 | 1 | 1 or 2 |
| Width of contact point (k) |  | 1 cm < k < 4 cm | 1 cm < k < 2.5 cm | 1 cm < k < 3.5 cm | 1 cm < k < 8 cm |
| Total width of contact points (L) |  | 1 cm < L < 4 cm | 1 cm < L < 2.5 cm | 1 cm < L < 3.5 cm | 1 cm < L < 10 cm |
| Distance between contact points (d) |  |  |  |  | d < 2 cm |

Figure 4C:
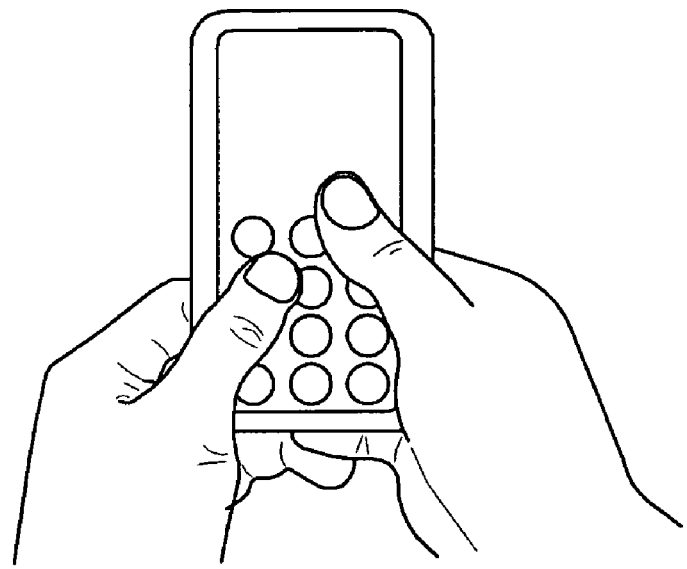

FIG. 4C illustrates both hands of the user who is holding the mobile terminal vertically. In tables 6 and 7, a both hands/vertical grip posture illustrated in FIG. 4C is defined.

TABLE 6

|  | Upper portion | Bottom portion | Left side | Right side | Rear side |
|---|---|---|---|---|---|
| R1 |  |  |  |  |  |
| R2 |  |  |  | * | 1 |
| R3 |  |  |  | * | 1 |
| R4 |  |  |  |  | * |
| R5 |  |  |  |  |  |
| R6 |  |  | 1 |  |  |
| L1 |  |  |  |  |  |
| L2 |  |  | * |  | 1 |
| L3 |  |  | * |  | 1 |
| L4 |  |  |  |  | * |
| L5 |  |  |  |  |  |
| L6 |  |  |  | 1 |  |

TABLE 7

|  | Upper portion | Bottom portion | Left side | Right side | Rear side |
|---|---|---|---|---|---|
| Number of contact points |  |  | 1, 2 or 3 | 1, 2, or 3 | 4, 5, or 6 |
| Width of contact point (k) |  |  | 1 cm < k < 10 cm | 1 cm < k < 10 cm | 0.5 cm < k < 10 cm |
| Width of total contact points (L) |  |  | 1 cm < L < 10 cm | 1 cm < L < 10 cm | L < 10 cm |
| Distance between contact points (d) |  |  | 0.5 cm < d < 8 cm | 0.5 cm < d < 8 cm | 0.5 cm < d < 7 cm |

Figure 4D:
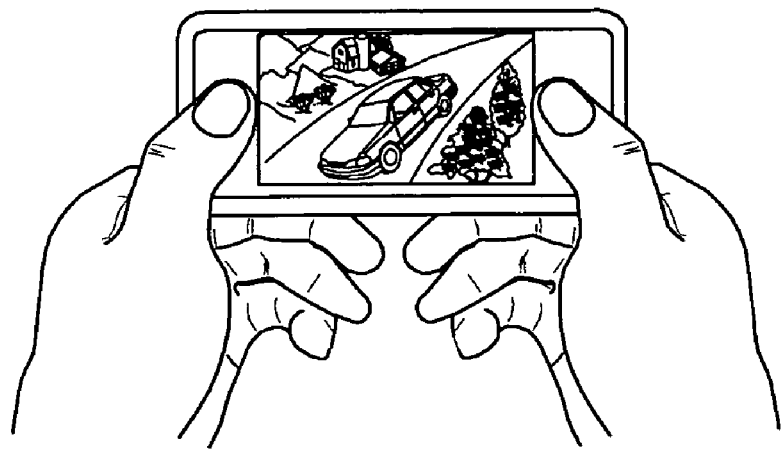

FIG. 4D illustrates both hands of the user who is holding the mobile terminal horizontally. In Tables 8 and 9, a both hands/horizontal grip posture shown in FIG. 4D is defined.

TABLE 8

|  | Upper portion | Bottom portion | Left side | Right side | Rear side |
|---|---|---|---|---|---|
| R1 |  |  |  |  |  |
| R2 |  |  |  |  | * |
| R3 |  |  |  |  | 1 |
| R4 |  |  |  |  | 1 |
| R5 |  |  |  |  |  |
| R6 |  |  |  | * |  |
| L1 |  |  |  |  |  |
| L2 |  |  |  |  | * |
| L3 |  |  |  |  | 1 |
| L4 |  |  |  |  | * |
| L5 |  |  |  |  |  |
| L6 |  |  | * |  |  |

TABLE 9

|  | Upper portion | Bottom portion | Left side | Right side | Rear side |
|---|---|---|---|---|---|
| Number of contact points |  |  | 0 or 1 | 0 or 1 | 3-6 |
| Width of contact point (k) |  |  | 1 cm < k < 4 cm | 1 cm < k < 4 cm | 0.5 cm < k < 7 cm |
| Total width of contact points (L) |  |  | 1 cm < L < 4 cm | 1 cm < L < 4 cm | L < 11 cm |
| Distance between contact points (d) |  |  |  |  | 0.5 cm < d < 9 cm |

The characteristic data of each grip posture defined as described above is stored in the memory 820, and the characteristic extraction unit 800 extracts characteristic data of the user's current grip posture which is identical to the characteristic data stored in the memory 820, from the received sensor output signals.

The characteristic extraction unit 800 may extract the number of contact points in each portion, the width of each contact point, a distance between adjacent contact points, and the total width of contact points using the received sensor output signals.

The grip posture recognition unit 710 may use a pattern recognition method to recognize the user's grip posture from the received sensor output signals.

The pattern recognition method can include the following procedures.

First, a large amount of data on {input X, class C} is collected from a user. Then, the collected data is divided into learning data and test data. Next, the learning data is provided to a pattern recognition system, and a learning operation is performed. The model parameters of the pattern recognition system are changed according to the learning data. Then, only the input X is provided to the pattern recognition system, and thus the system outputs the class C.

According to an example of the present embodiment, the pattern recognition method may use an artificial neuron network. The artificial neuron network is a model obtained by simplifying neurotransmission processes of a living creature and mathematically analyzing the processes. In the artificial neural network, an operation is analyzed through a learning process in which weights on connections between neurons are adjusted according to the types of connections. This procedure is similar to a procedure in which people learn and memorize. Through this procedure, inference, classification, prediction, etc., can be carried out. In the artificial neural network, a neuron corresponds to a node, and intensities of connections between neurons correspond to weights on arcs between nodes. The artificial neural network may be a multi-layer perceptron neural network including a plurality of single-layer perceptrons and may learn using backpropagation learning.

The backpropagation learning is implemented by generalizing a Widrow-Hoff learning rule to multiple-layer networks and nonlinear differentiable transfer functions and is usually used for character recognition and nonlinear prediction. Each node in a neural network uses one of a plurality of diverse differentiable transfer functions to generate an output. A log sigmoid transfer function (logsig) shown in Equation 1 is most widely used.

$$f(x) = \frac{1}{1+e^{-x}} \quad (1)$$

This function outputs a value ranging from 0 to 1 according to an input value ranging from minus infinity to plus infinity. A desired function is learned while a deviation between a desired output value and an actual output value is reduced using a backpropagation algorithm.

When a signal output from a sensor is input to nodes on an input layer of the artificial neural network, the signal is changed in each node and then transmitted to a medium layer. In the same manner, the signal is transmitted to the final layer, which outputs a motion pattern. The intensity of connections between nodes (hereinafter, referred to as "node connection intensity") is adjusted such that a difference between activation values output from the artificial neural network and activation values defined for individual patterns during learning is reduced. In addition, according to a delta learning rule, a lower layer adjusts a node connection intensity based on a result of backpropagation on an upper layer to minimize an error. According to the delta learning rule, the node connection intensity is adjusted such that an input/output function minimizes the sum of squares of errors between a target output and outputs obtained from all individual input patterns in a network including nonlinear neurons.

After learning all of the predetermined grip postures through the above-described leaning process, the artificial neural network receives a motion signal from the sensor unit 700 (FIG. 7) and recognizes the signal as one of the predetermined grip postures.

The artificial neural network may be operated to relearn grip postures according to a user's selection when necessary. For example, when a user selects a grip posture to be relearned and makes a motion corresponding to the selected grip posture a plurality of times, the artificial neural network may relearn the grip posture reflecting the motion made by the user.

In another example of the present embodiment, a user's grip posture may be recognized using an SVM (Support Vector Machine). Here, an N-dimensional vector space is formed from N-dimensional features of motion signals. After an appropriate hyperplane is found based on learning data, patterns can be classified using the hyperplane. Each of the patterns can be defined by Equation 2.

$$\text{class}=1 \text{ if } W^T X + b \geq 0$$

$$\text{class}=0 \text{ if } W^T X + b < 0 \quad (2)$$

where W is a weight matrix, X is an input vector, and b is an offset.

In still another example of the present embodiment, a grip posture may be recognized using template matching. In this case, after template data with which grip postures are classified is selected from learning data, a template data item closest to a current input is found and the current input is classified into a grip posture corresponding to the template data item. In other words, with respect to input data $X = P(x_1, \ldots x_n)$ and an i-th data item $Y_i = P(y_1, \ldots y_n)$ among the learning data, $Y^*$ can be defined as $$Y^* = \min_i \text{Distance}(X, Y_i) \quad (3)$$

where distance (X, Y) can be calculated using $$\text{Distance}(X, Y) = \|X - Y\| = \sqrt{\sum_{i=1}^{n}(x_i - y_i)^2} \quad (4)$$

According to Equations 3 and 4, the input X is classified into a grip posture to which data $Y^*$ belongs.

In yet another example of the present embodiment, a grip posture may be recognized using a hidden Markov model. The hidden Markov model is a set of states connected via transitions and output functions associated with each state. A model is composed of two kinds of probabilities: a transition probability needed for transition and an output probability indicating a conditional probability of observing an output symbol included in a finite alphabet at each state. Since similarity between an input pattern and a reference pattern is estimated, the hidden Markov model may provide a plurality of candidates. In addition, since temporal-spatial change is represented with probabilities in a state and a transition, it is not necessary to additionally consider the temporal-spatial change in the reference pattern during a matching process.

Besides the above-described pattern recognition methods, other diverse pattern recognition methods may be used to recognize the user's grip posture using the sensor output signals.

The function detection unit 720 receives the user's grip posture from the grip posture recognition unit 710, and detects a function corresponding to the grip posture (operation 120). A memory (not shown) may store functions corresponding to individual grip patterns recognizable by the grip posture recognition unit 710. The function detection unit 720 may search the memory to detect the function corresponding to the input user's grip posture.

When using a phone call function, a user generally holds the mobile terminal vertically with a right hand as illustrated in FIG. 4B, and thus the right hand/vertical grip posture may correspond to the phone call function.

When using a character input function to send a text message, the user generally holds the mobile terminal vertically with both hands as illustrated in FIG. 4C, and therefore the both hand/vertical grip posture may correspond to the character input function.

When a user plays a game using the mobile terminal, the user typically holds the mobile terminal horizontally with both hands, and hence the both hands/horizontal grip posture may correspond to a game function.

If two or more functions corresponding to the same grip posture are present, the functions may be stored in the memory.

Figure 6:
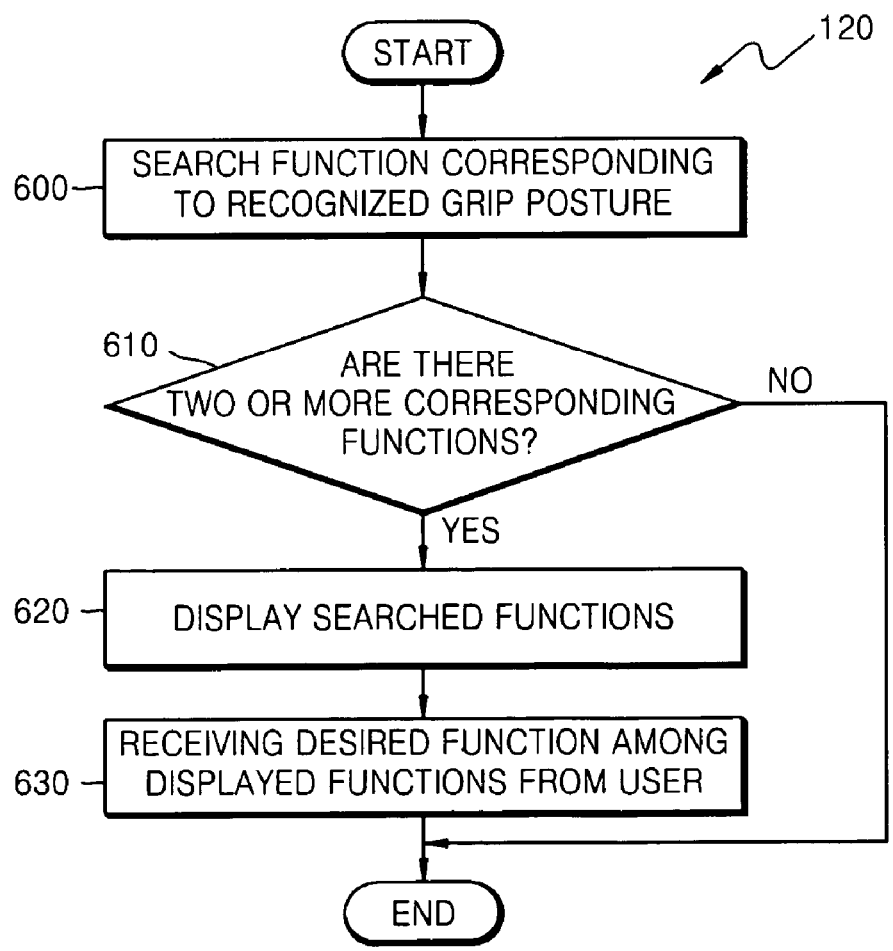
FIG. 6 is a flowchart illustrating a function detecting operation of FIG. 1.

FIG. 6 is a flowchart illustrating an example of the function detecting operation (operation 120). Referring to FIG. 6, the function detection unit 720 searches for a function corresponding to the recognized grip type (operation 600). The function detection unit 720 checks if two or more functions has been found (operation 610). If there are two or more functions found, the function detection unit 720 displays names of the functions on an LCD (not shown) (operation 620). The function detection unit 720 receives a desired function selected from the displayed functions by a user using an input unit such as a keypad formed on the mobile terminal (operation 630).

When the function detection unit 720 finds and outputs the function corresponding to the user's current grip type, the function performing unit 730 performs the detected function (operation 130). In the case of a phone call function, the function performing unit 730 may display a screen for inputting a phone number or searching stored phone numbers on an LCD formed on the mobile terminal.

Embodiments of the present invention include computer-readable code on a computer-readable recording medium. The computer-readable recording medium is any data storage device that can store data which can be thereafter read by a computer system. Examples of the computer-readable recording medium include read-only memory (ROM), and random-access memory (RAM), CD-ROMs, magnetic tapes, floppy disks, optical data storage devices. The computer-readable recording medium can also be distributed over network coupled computer systems so that the computer-readable code is stored and executed in a distributed fashion.

According to the above-described embodiments of the present invention, in an apparatus and method for inputting a function in a mobile terminal using a user's grip posture, user's grip postures formed when performing the functions of a mobile terminal such as a mobile phone are considered, specific functions are, respectively, matched to a plurality of grip postures. When the mobile terminal is held by a user, the grip posture of the user is recognized, and a function corresponding to the recognized grip posture is automatically performed without any additional operation such as a key input operation. Accordingly, a complex input unit or input method is not required even when diverse functions are provided by the mobile terminal, and the user can easily and conveniently use the mobile terminal.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of inputting a function of a mobile terminal, the method comprising:
    recognizing a grip posture of a user gripping the mobile terminal, wherein the recognized grip posture is one of a plurality of grip postures; and
    detecting a function corresponding to the recognized grip posture,
    wherein the recognizing a grip posture comprises:
        receiving output signals from a plurality of touch sensors on the mobile terminal; and
        recognizing the grip posture using the output signals from the touch sensors, wherein the recognizing the grip posture using the output signals comprises:
            dividing the surface of the mobile terminal into a plurality of portions;
            detecting a number of contact points, a contact width of each detected contact point, and a distance between adjacent contact points in each portion of the mobile terminal using the sensor output signals; and
            determining the user's grip posture using the detected number of contact points, the contact width of each detected contact point, and the distance between adjacent contact points in each portion of the mobile terminal,
    wherein the method is performed using at least one computer system, and
    wherein the recognized grip posture changes function and display orientation of a screen of the mobile terminal.

2. The method of claim 1, wherein the plurality of touch sensors are arranged on a surface of the mobile terminal at regular intervals.

3. The method of claim 1, wherein the plurality of touch sensors are arranged in each of the portions at different intervals according to how frequently the user touches each portion when the user grips the mobile terminal.

4. The method of claim 3, wherein the plurality of portions of the mobile terminal include a front side, a rear side, an upper portion, a bottom portion, a left side and a right side.

5. The method of claim 1, wherein, in the recognizing the grip posture using the output signals, the user's grip posture is recognized from the output signals by using one of an artificial neuron network, a template matching, a hidden Markov model, and a support vector machine (SVM).

6. The method of claim 5, wherein the plurality of portions of the mobile terminal include a front side, a rear side, an upper portion, a bottom portion, a left side and a right side.

7. The method of claim 1, wherein the plurality of portions of the mobile terminal include a front side, a rear side, an upper portion, a bottom portion, a left side and a right side.

8. The method of claim 1, wherein the grip posture includes at least one of a right hand/vertical grip, a right hand/horizontal grip, a both hands/horizontal grip, a both hands/vertical grip, a left hand/horizontal grip, and a left hand/vertical grip.

9. The method of claim 8, wherein the function corresponding to the recognized grip posture is a phone call function when the recognized grip posture is a right hand/vertical grip.

10. The method of claim 8, wherein the function corresponding to the recognized grip posture is a text input function when the recognized grip posture is a both hands/vertical grip.

11. The method of claim 8, wherein the function corresponding to the recognized grip posture is a photography function when the recognized grip posture is a right hand/horizontal grip.

12. The method of claim 8, wherein the function corresponding to the recognized grip posture is a game function when the recognized grip posture is a both hands/horizontal grip.

13. The method of claim 1, wherein the detecting a function comprises detecting one of plural functions corresponding to the recognized grip posture based on at least one of a key input and a current function of the mobile terminal.

14. The method of claim 1, further comprising, when at least two functions correspond to the recognized grip posture:
   displaying the functions; and
   receiving a function that the user wants to perform among the displayed functions.

15. A non-transitory computer readable recording medium storing a program for executing the method of claim 1.

16. A method of inputting a function of a mobile terminal, the method comprising:
   recognizing a grip posture of a user gripping the mobile terminal, wherein the recognized grip posture is one of a plurality of grip postures; and
   detecting a function corresponding to the recognized grip posture,
   wherein the recognizing the grip posture comprises:
   dividing the surface of the mobile terminal into a plurality of portions;
   detecting a number of contact points, a contact width of each detected contact point, and a distance between adjacent contact points in each portion of the mobile terminal; and
   determining the user's grip posture using the detected number of contact points, the contact width of each detected contact point, and the distance between adjacent contact points in each portion of the mobile terminal,
   wherein the method is performed using at least one computer system, and
   wherein the recognized grip posture changes function and display orientation of a screen of the mobile terminal.

17. The method of claim 16, wherein the plurality of portions of the mobile terminal include a front side, a rear side, an upper portion, a bottom portion, a left side and a right side.

18. A function input apparatus included in a mobile terminal, the apparatus comprising:
   a grip posture recognition unit to recognize a grip posture of a user gripping the mobile terminal, wherein the recognized grip posture is one of a plurality of grip postures; and
   a function detection unit to detect a function corresponding to the recognized grip posture,
   wherein the grip posture recognition unit comprises:
   a plurality of touch sensors;
   a contact detection unit to detect whether the user contacts individual portions into which the surface of the mobile terminal is divided based on output signals from touch sensors in the individual portions; and
   a grip posture determining unit to determine the user's grip posture using the detection result for each portion,
   wherein the contact detection unit detects a number of contact points, a contact width of each detected contact point, and a distance between adjacent contact points in each portion, and the grip posture determining unit determines the user's grip posture using the detected number of contact points, the contact width of each detected contact point, and the distance between adjacent contact points at each portion, and wherein the recognized grip posture changes function and display orientation of a screen of the mobile terminal.

19. The function input apparatus of claim 18, wherein the plurality of touch sensors are arranged on the surface of the mobile terminal at regular intervals.

20. The function input apparatus of claim 18, wherein the plurality of touch sensors are arranged on each of the portions at different intervals according to how frequently the user touches each portion when the user grips the mobile terminal.

21. The function input apparatus of claim 20, wherein the plurality of portions of the mobile terminal include a front side, a rear side, an upper portion, a bottom portion, a left side and a right side.

22. The function input apparatus of claim 18, wherein the grip posture recognition unit recognizes the user's grip posture using one of an artificial neuron network, a template matching, a hidden Markov model, and a support vector machine (SVM).

23. The function input apparatus of claim 18, wherein the grip posture includes at least one of a right hand/horizontal grip, a right hand/vertical grip, a both hands/horizontal grip, a both hands/vertical grip, a left hand/horizontal grip, and a left hand/vertical grip.

24. The function input apparatus of claim 18, wherein the function detection unit receives a key input from a user, determines a current function of the mobile terminal, and detects one of plural functions corresponding to the recognized grip posture based on at least one of the key input and the current function of the mobile terminal.

25. The function input apparatus of claim 18, further comprising:
   a display unit displaying information to a user; and
   a user input unit receiving an input from a user,
   wherein, when two or more functions corresponds to the recognized grip posture, the display unit displays the functions corresponding to the recognized grip posture and the user input unit receives a function that the user wants to perform among the displayed functions.

26. A function input apparatus, the apparatus comprising:
   a sensor unit having a plurality of touch sensors individually detecting a user's contact with the mobile terminal, the detected contact defining a detected grip posture;
   a grip posture recognition unit to recognize a grip posture based on the detected grip posture from the sensor unit, wherein the recognized grip posture is one of a plurality of grip postures; and
   a function detection unit to detect a function corresponding to the recognized grip posture,
   wherein the grip posture recognition unit comprises:
   a characteristic extraction unit to extract characteristic data of a detected grip posture; and
   a memory search unit to search a memory and to output as the recognized grip posture a grip posture which is defined in characteristic data stored in the memory that corresponds to the characteristic data of detected grip posture,
   wherein the characteristic data comprises a number of contact points in each portion, a contact width of each detected contact point, and a distance between adjacent contact points in each portion, which are used to determine the user's grip posture, and
   wherein the recognized grip posture changes function and display orientation of a screen of the mobile terminal.

27. The apparatus of claim 26, further comprising a function performing unit performing the detected function.

28. A method of inputting a function of a mobile terminal, the method comprising:

recognizing a grip posture of a user gripping the mobile terminal, wherein the recognized grip posture is one of a plurality of grip postures; and detecting a function corresponding to the recognized grip posture, wherein the recognizing a grip posture comprises:

receiving output signals from a plurality of touch sensors on the mobile terminal; and recognizing the grip posture using the output signals from the touch sensors, wherein the recognizing the grip posture using the output signals comprises:

dividing the surface of the mobile terminal into a plurality of portions;

detecting a number of contact points, a contact width of each detected contact point, a distance between adjacent contact points, and a total width of detected contact points in each portion of the mobile terminal using the sensor output signals; and determining the user's grip posture using the detected number of contact points, the contact width of each detected contact point, the distance between adjacent contact points, and a total width of detected contact points in each portion of the mobile terminal, wherein the method is performed using at least one computer system, and wherein the recognized grip posture changes function and display orientation of a screen of the mobile terminal.

29. A method of inputting a function of a mobile terminal, the method comprising:

recognizing a grip posture of a user gripping the mobile terminal, wherein the recognized grip posture is one of a plurality of grip postures; and detecting a function corresponding to the recognized grip posture, wherein the recognizing the grip posture comprises:

dividing the surface of the mobile terminal into a plurality of portions;

detecting a number of contact points, a contact width of each detected contact point, a distance between adjacent contact points, and a total width of detected contact points in each portion of the mobile terminal; and determining the user's grip posture using the detected number of contact points, the contact width of each detected contact point, the distance between adjacent contact points, and a total width of detected contact points in each portion of the mobile terminal, wherein the method is performed using at least one computer system, and wherein the recognized grip posture changes function and display orientation of a screen of the mobile terminal.

30. A function input apparatus included in a mobile terminal, the apparatus comprising:

a grip posture recognition unit to recognize a grip posture of a user gripping the mobile terminal, wherein the recognized grip posture is one of a plurality of grip postures; and a function detection unit to detect a function corresponding to the recognized grip posture, wherein the grip posture recognition unit comprises:

a plurality of touch sensors;

a contact detection unit to detect whether the user contacts individual portions into which the surface of the mobile terminal is divided based on output signals from touch sensors in the individual portions; and a grip posture determining unit to determine the user's grip posture using the detection result for each portion, wherein the contact detection unit detects a number of contact points, a contact width of each detected contact point, a distance between adjacent contact points, and a total width of detected contact points in each portion, and the grip posture determining unit determines the user's grip posture using the detected number of contact points, the contact width of each detected contact point, the distance between adjacent contact points, and a total width of detected contact points at each portion, and wherein the recognized grip posture changes function and display orientation of a screen of the mobile terminal.

31. A function input apparatus, the apparatus comprising:

a sensor unit having a plurality of touch sensors individually detecting a user's contact with the mobile terminal, the detected contact defining a detected grip posture;

a grip posture recognition unit to recognize a grip posture based on the detected grip posture from the sensor unit, wherein the recognized grip posture is one of a plurality of grip postures; and a function detection unit to detect a function corresponding to the recognized grip posture, wherein the grip posture recognition unit comprises:

a characteristic extraction unit to extract characteristic data of a detected grip posture; and a memory search unit to search a memory and to output as the recognized grip posture a grip posture which is defined in characteristic data stored in the memory that corresponds to the characteristic data of detected grip posture, wherein the characteristic data comprises a number of contact points in each portion, a contact width of each detected contact point, a distance between adjacent contact points, and a total width of detected contact points in each portion, which are used to determine the user's grip posture, and wherein the recognized grip posture changes function and display orientation of a screen of the mobile terminal.

* * * * *